(12) United States Patent
Kadota

(10) Patent No.: US 8,014,014 B2
(45) Date of Patent: Sep. 6, 2011

(54) STATUS INFORMATION PROCESSOR

(75) Inventor: Masatoshi Kadota, Takahama (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1351 days.

(21) Appl. No.: 11/199,302

(22) Filed: Aug. 9, 2005

(65) Prior Publication Data

US 2006/0033944 A1    Feb. 16, 2006

(30) Foreign Application Priority Data

Aug. 10, 2004  (JP) .................... 2004-233435

(51) Int. Cl.
G06F 3/12 (2006.01)
(52) U.S. Cl. ...................................... 358/1.15
(58) Field of Classification Search .................. 358/1.15
See application file for complete search history.

(56) References Cited

U.S. PATENT DOCUMENTS

| | | | | |
|---|---|---|---|---|
| 6,014,511 A * | 1/2000 | Krithivas et al. | ............... | 703/26 |
| 6,697,073 B1 * | 2/2004 | Kadota | ................ | 345/501 |
| 7,024,434 B2 * | 4/2006 | Fuller et al. | .................. | 707/203 |
| 2002/0010827 A1 * | 1/2002 | Cheng | ............................ | 711/103 |
| 2003/0063310 A1 * | 4/2003 | Nguyen et al. | ............... | 358/1.15 |
| 2003/0103081 A1 | 6/2003 | Ebuchi | | |
| 2003/0231328 A1 * | 12/2003 | Chapin et al. | ................ | 358/1.13 |

FOREIGN PATENT DOCUMENTS

| | | |
|---|---|---|
| JP | 2000 112685 | 4/2000 |
| JP | 2001 265546 | 9/2001 |
| JP | 2002 337366 | 11/2002 |
| JP | 2003 167718 | 6/2003 |

* cited by examiner

Primary Examiner — Benny Q Tieu
Assistant Examiner — Jeremiah A Bryar
(74) Attorney, Agent, or Firm — Banner & Witcoff, Ltd.

(57) ABSTRACT

In a status information processor, at least one is selected from a plurality of arbitrators that are different from each other in terms of an OS or specifications of an input-output port. The thus-selected arbitrator is provided in a PC. At least one is selected from a plurality of parsers that are different from each other in terms of an OS or specifications of a printer, and the thus-selected parser is provided in the PC. The plurality of arbitrators are compatible with an interface to the parser. The plurality of parsers are compatible with the arbitrator. The arbitrator and the parser can operate in conjunction with each other even when provided in the PC in any combination.

9 Claims, 8 Drawing Sheets

FIG. 3

| | PJL | FIRST UNIQUE PROTOCOL | SECOND UNIQUE PROTOCOL | PARSER OUTPUT |
|---|---|---|---|---|
| IDLE STATE | @PJL USTATUS DEVICE<br>CODE=10001<br>DISPLAY="READY<br>ONLINE=TRUE | STATUS = IDLE | 01H | CODE(4byte) : 10001<br>DISPLAY(MAX 64byte) : READY<br>ONLINE(4byte) : 1 |
| WARM-UP | @PJL USTATUS DEVICE<br>CODE=10003<br>DISPLAY="WARMING UP<br>ONLINE=TRUE | STATUS = WARMINGUP | 02H | CODE(4byte) : 10003<br>DISPLAY(MAX 64byte) : WARMING UP<br>ONLINE(4byte) : 1 |
| COVER OPEN ERROR | @PJL USTATUS DEVICE<br>CODE=40021<br>DISPLAY="COVER OPEN<br>ONLINE=FALSE | STATUS = COVEROPEN | 03H | CODE(4byte) : 40021<br>DISPLAY(MAX 64byte) : COVER OPEN<br>ONLINE(4byte) : 0 |
| PAPER EMPTY ERROR | @PJL USTATUS DEVICE<br>CODE=41002<br>DISPLAY="NO PAPER MP<br>ONLINE=FALSE | STATUS = NOPAPER | 04H | CODE(4byte) : 41002<br>DISPLAY(MAX 64byte) : NO PAPER MP<br>ONLINE(4byte) : 0 |
| ... | ... | ... | ... | ... |

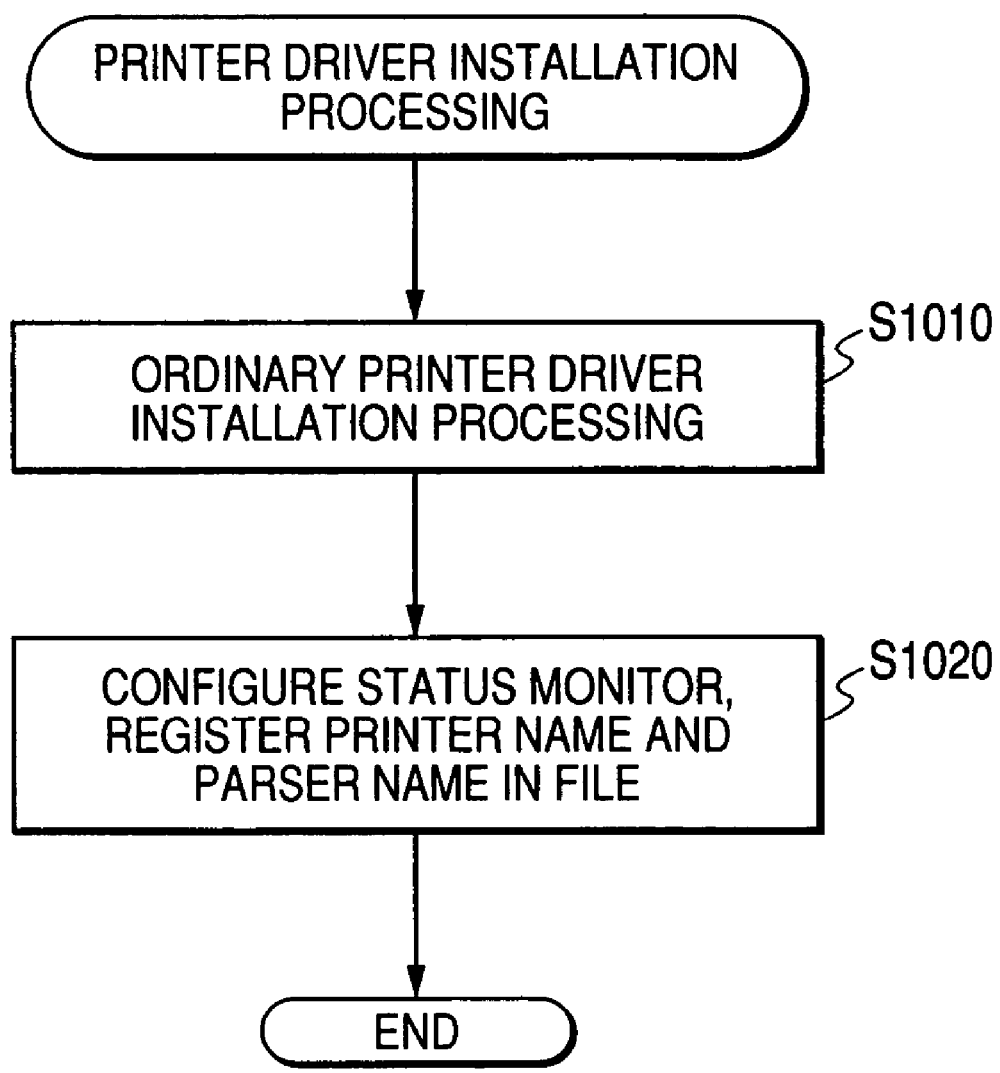

STATUS INFORMATION PROCESSOR

BACKGROUND

1. Field

A status information processor that receives an input of status information transmitted from an image forming apparatus to a computer and outputs the status information to an apparatus which is to be a destination of an output, and a data processing program product for use with the status information processor.

2. Related Art

When using a printer in a state connected to a computer, the practice of installing a program called a status monitor in the computer and monitoring the status of the printer with the status monitor has hitherto been followed (see, e.g., JP-A-2001-265546).

Utilization of the status monitor enables ascertainment of information regarding the status of the printer (hereinafter called "status information"); e.g., a printer cover being opened, occurrence of a medium jam, depletion of paper, or the like, on a computer screen. An operator of the computer can ascertain the status of the printer without going to the location where the printer is set.

A printer port utilized for connection with a printer is available in various schemes and protocols; e.g., a PARALLEL protocol (IEEE 1284), a USB (Universal Serial Bus) protocol, an IEEE 1394 protocol, and an IrDA (Infrared Data Association) protocol. Which protocol of port to use for connecting the printer to the computer is determined by specifications of the printer.

Data format of status information transmitted from a printer to a computer varies according to specifications of the printer. For example, some printers provide status information in the form of a character string (text data) whose contents are comprehensible for the user when the user glances at the information, and some other printers provide status information in the form of a binary digit string (binary data).

For these reasons, a related-art status monitor is configured to perform data processing in compliance with specifications of the printer to be monitored, on the premise that status information is transmitted in the form of a specific data format by way of a specific printer port.

However, For example, when the number of types of printer ports is "m" and the number of data formats of the status information is "n," up to m-by-n status monitors are required. Status information having a data format differing from the existing "n" types of data formats is assumed to be newly added, and the number of types of printer ports is assumed to be "m". Despite addition of status information of only one type of data format, a maximum of "m" types of status monitors corresponding to "m" types of printer ports must be newly prepared. For the reason, there has been a problem of development and manufacture of a status monitor involving consumption of considerable cost and amounts of time.

A port monitor that is made compatible with several types of ports with a single program is also available. Even in the case of such a port monitor, when the port monitor is connected to another printer having a port of a new protocol, another port monitor compatible with that port must be newly created.

Another problem is that several status monitor displays appear on the screen as the number of port monitors becomes greater.

SUMMARY

A status information processor capable of curtailing cost and time, which are required by development and manufacture, to a greater extant than that realized by a related-art status information processor.

A status information processor operates on a computer. The status information processor includes: at least one of primary processing units that is provided selectively from among the primary processing units that each receives status information representing status of an image forming apparatus from the image forming apparatus through an input-output port provided in the computer in a format depending on specifications of the input-output port, and converts the status information into intermediate data that is independent from the specifications of the input-output port; and at least one of secondary processing units that is provided selectively from among the secondary processing units that each converts the intermediate data into a universal data that is independent from specifications of the image forming apparatus. Each of the primary processing units has an interface compatible with any one of the secondary processing units. Each of the secondary processing units has an interface compatible with any one of the primary processing units.

A computer-readable program product causes a computer to perform procedures of a secondary processing unit provided in a status information processor that operates on the computer. The program product causes the computer to perform procedures including: selecting at least one of primary processing units from among the primary processing units that each receives status information representing status of an image forming apparatus from the image forming apparatus through an input-output port provided in the computer in a format depending on specifications of the input-output port, and converts the status information into intermediate data that is independent from the specifications of the input-output port; and converting the intermediate data into a universal data that is independent from specifications of the image forming apparatus.

BRIEF DESCRIPTION OF THE DRAWINGS

In the accompanying drawings:

FIG. 3 is a list showing status information that changes according to specifications of a printer and unified status information output from a parser;

FIG. 4 is a flowchart of printer driver installation processing;

DETAILED DESCRIPTION OF THE EMBODIMENTS

An embodiment will be described below with reference to the drawings.

Figure 1:
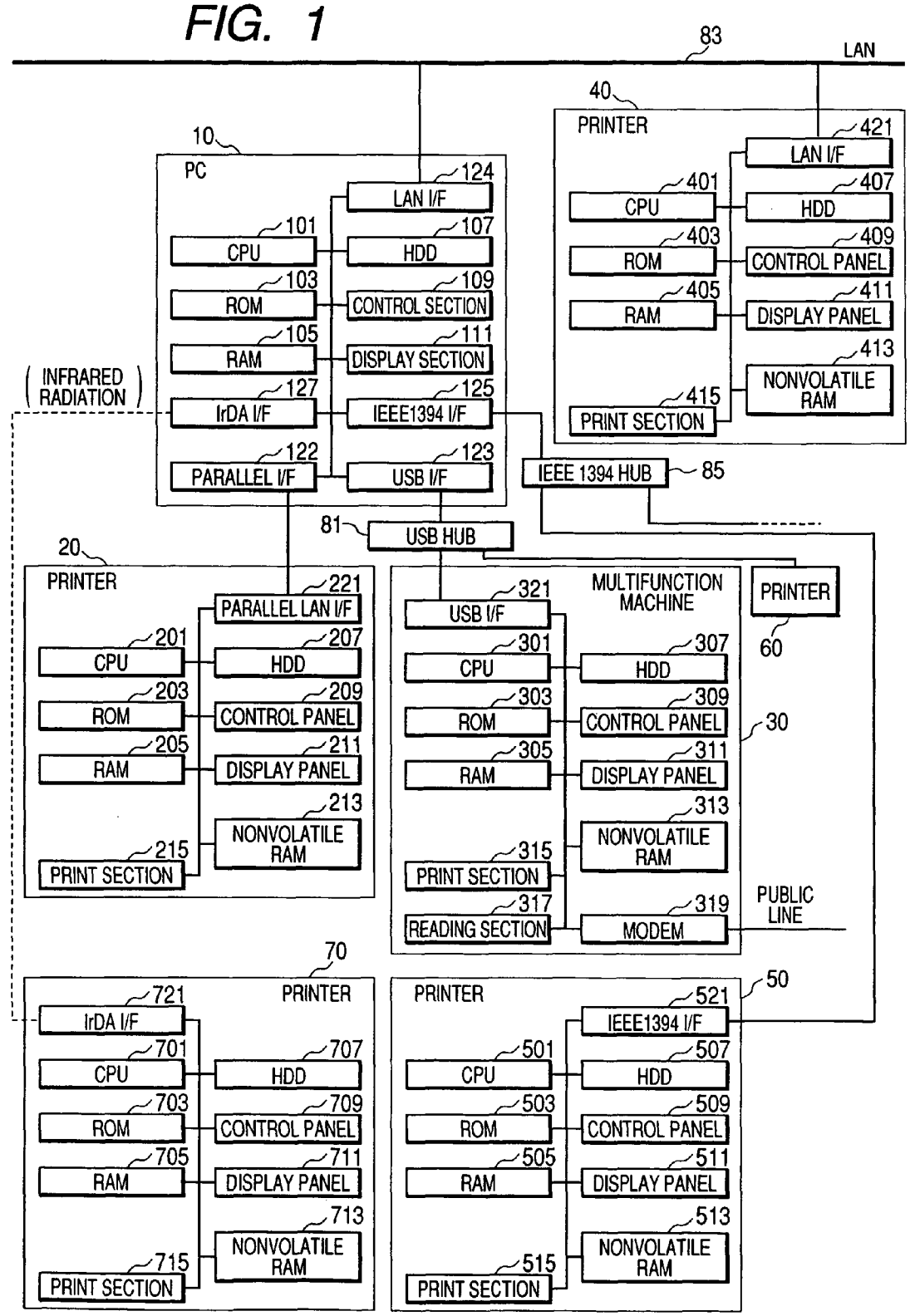
FIG. 1 is a block diagram of a network system including a status information processor and an image forming apparatus, according to an embodiment.

FIG. 1 is a schematic block diagram showing the overall configuration of a system illustrated as the embodiment.

The system includes a personal computer 10 (hereinafter called a "PC 10"), printers 20, 40, 50, 60 and 70, and a multifunction machine 30. Of these devices, the PC 10 is a device that functions as a status information processor. The printer 20, the multifunction machine 30, the printer 50, the printer 60, and the printer 70 act as image forming devices. The printer 40 is a device that receives processing pertaining to status information through use of means that does not correspond to the status information processor. However, the present system allows coexistence of such a printer 40.

The printer 20, the printer 50, and the printer 70 are connected directly to the PC 10 by way of custom-designed cables for each of the devices. The multifunction machine 30 and the printer 60 are connected to a USB hub 81 by way of custom-designed cables for each of the devices, as well as to the PC 10 by way of the USB hub 81. The printer 40 is connected to a LAN 83 by way of a LAN cable, and to the PC 10 by way of the LAN 83. The printer 50 is connected to an IEEE 1394 hub 85 by way of a custom-designed cable, as well as to the PC 10 by way of the IEEE 1394 hub 85.

The PC 10 includes a CPU 101, ROM 103, RAM 105, a hard disk drive 107 (hereinafter called an HDD 107), a control section 109, and a display section 111. The CPU 101 is a device that performs control and arithmetic operations of individual sections in the PC 10 in accordance with programs stored in the ROM 103 and the RAM 105. The ROM 103 is a storage device that retains recorded data even after a power switch of the PC 10 has been cut and stores a BIOS (Basic Input Output System) and several sets of basic setting data. The RAM 105 is a main storage device capable of storing an OS and various application programs, which are read from the HDD 107, and various types of data stemming from computing operation of the CPU 101 are also stored in the RAM 105. The HDD 107 is a device that stores an OS, various types of application programs, and various types of data files. The control section 109 includes a keyboard and a variety of pointing devices (e.g., a mouse) or the like. The display section 111 is formed from a liquid-crystal display, or the like, which displays a color image.

The PC 10 includes, as an interface section used for establishing connection with another device, a parallel interface section 122 (hereinafter called a parallel I/F 122), an USB interface section 123 (hereinafter called an USB I/F 123), a LAN interface section 124 (hereinafter called a LAN I/F 124), an IEEE 1394 interface section 125 (hereinafter called an IEEE 1394 I/F 125), and an IrDA interface section 127 (hereinafter called an IrDA I/F 127). The parallel I/F 122 is an interface conforming to the IEEE 1284 protocol (standards) and has become widespread chiefly as an interface for connection with a printer. The USB I/F 123 is a serial interface complying with the USB protocol (standards). This interface enables connection of a plurality of devices by utilization of the USB hub 81. There are numerous devices that can connect to the USB I/F 123. In addition to the printer, a keyboard, a mouse, a scanner, a speaker, and various types of storage devices are connected to the USB I/F 123. The LAN I/F 124 is an interface complying with IEEE 802.3/IEEE 802.3u (10BASE-T/100BASE-TX) protocol (standards). The IEEE 1394 I/F 125 is a serial interface complying with the IEEE 1394 protocol (standards) and enables connection of a plurality of devices by utilization of the IEEE 1394 hub 85. In addition to a peripheral device for use with a PC, household electrical appliances, such as a digital video camera and a video deck, adopt the IEEE 1394 I/F 125. The IrDA I/F 127 is an interface complying with the IrDA protocol (standards) and enables data communication utilizing infrared rays.

Windows (registered trademark) is installed in the PC 10 as an OS. The OS offers input/output functions, such as a keyboard input, a screen output, and commands for establishing communication with various I/F, and basic functions commonly utilized by an application, such as management of a hard disk drive and memory.

The printer 20 includes a CPU 201, ROM 203, RAM 205, a hard disk drive 207 (hereinafter called an HDD 207), a control panel 209, a display panel 211, nonvolatile RAM 213, a print section 215, and a parallel I/F 221. The CPU 201 performs control and various operations of individual sections in the printer 20 in accordance with a control program stored in the ROM 203. The ROM 203 stores various sets of data in addition to the control program. The RAM 205 temporarily stores various types of data that are computed by the CPU 201 through processing. The HDD 207 is a storage in which, when data of comparatively large size, such as image data to be a target of printing, are transmitted from the PC 10, temporarily stores the data. As a result of provision of such an HDD 207, even when printing operation performed by the print section 215 involves consumption of time, data can be received from the PC 10 without awaiting completion of printing operation. The operation key 209 is operated when a basic command is issued to the printer 20. The display panel 211 is formed from a compact liquid-crystal display and can display information, such as setting and status of the printer 20. The nonvolatile RAM 213 is a storage that stores data which are desired to be protected from destruction, which would otherwise be caused by disconnection of a power supply, such as settings of the printer 20. The print section 215 is a section that operates when a medium (e.g., recording paper) is subjected to printing. The parallel I/F 221 is an interface complying with the IEEE 1284 protocol (standards), and data communication can be established with the PC 10 by utilization of the parallel I/F 221.

The multifunction machine 30 is a device having a printer function, an image scanner function, a copier function, a facsimile function, and a telephone function. The multifunction machine 30 includes a CPU 301, ROM 303, RAM 305, a hard disk drive 307 (hereinafter called an HDD 307), an operation key 309, a display panel 311, nonvolatile RAM 313, a print section 315, a reading section, 317, a modem 319, an USB I/F 321, and the like. The CPU 301 performs control and operations of individual sections of the multifunction machine 30 in accordance with the control program stored in the ROM 303. The ROM 303 stores various types of data in addition to the control programs. The RAM 305 temporarily stores various data computed by the CPU 301 during processing. The HDD 307 is a storage that stores image data of comparatively large size, such as an image received or transmitted by the facsimile function, an image read by the image scanner function, and an image to be printed by the printer function. The control panel 309 is to be operated when a basic command is sent to the multifunction machine 30. The display panel 311 is formed from a compact liquid-crystal display and can display information about the multifunction machine 30, such as settings or status thereof. The nonvolatile RAM 313 is a storage that stores data which are desired to be protected from destruction, which would otherwise be caused by disconnection of power supply, such as settings of the multifunction machine 30. The print section 315 prints image on a medium (e.g., recording paper) to printing, and is a section which is activated when printing of print data performed by the printer function, printing of a received image performed by the facsimile function, or printing of a copied image performed by the copy function is effected. The reading section 317 reads an image from an original set on an automatic original feeder (omitted from the drawings) or from an original placed on a contact glass of a flat bed. The reading section 317 is activated when reading of an image performed by the image scanner function, reading of an image to be transmitted by the facsimile function, or the like, is effected. The modem 319 is a device which converts the digital data prepared by the multifunction machine 30 into a voice signal and transmits the voice signal to a public line; and which converts the voice signal received over the public line into digital data so that the signal can be processed by the multifunction machine 30. The modem 319 is activated when transmission/receipt of the image performed by the facsimile function or communication performed by the phone function is effected. The USB I/F 321 is a serial interface complying with the USB protocol (standards). Communication of data can be established with the PC 10 by way of the USB hub 81 by utilization of the USB I/F 321.

The printers 40 to 70 differ from each other in terms of protocols of the communication interface used for communication with the PC 10, but are essentially identical in configuration with the printer 20 in terms of basic hardware. FIG. 1 shows internal configurations of the respective printers, and their detailed explanations are omitted.

Figure 2:
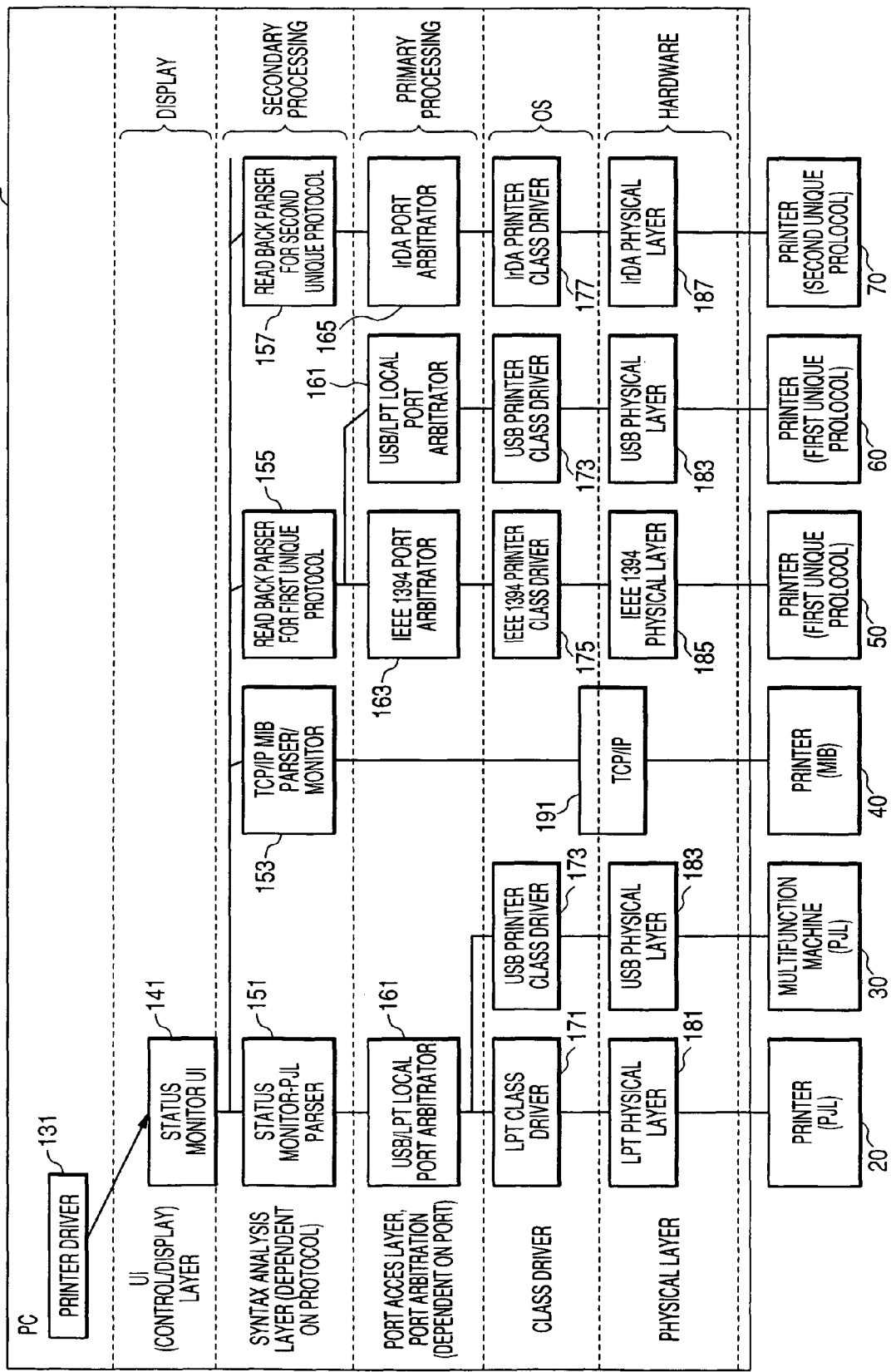
FIG. 2 is a hierarchical diagram of a processing system for status information provided in the status information processor.

A processing system related to status information processing in the PC 10 will now be described by reference to FIG. 2. As shown in FIG. 2, the processing system related to status information processing in the PC 10 is formed from software components and hardware, which form an UI (input/display) layer, a syntax analysis layer, a port access layer, a class driver, and a physical layer.

When the PC 10 produces a print output to any of the printer 20, the multifunction machine 30, and the printers 40 to 70, a printer driver 131 performs print-related processing. During the course of processing, a status monitor UI 141 is activated as a process different from that for the printer driver 131.

The status monitor UI 141 is a component which performs processing for receiving an input of operation from the user or processing for displaying status information. During the course of processing, a status monitor PJL parser 151, a TCP/IP MIB parser/monitor 153, a read-back parser 155 for a first unique protocol, and a read-back 157 parser for a second unique protocol are activated as a process different from that for the status monitor UI 141 (the status monitor PJL parser 151, TCP/IP MIB parser/monitor 153, the read-back parser 155 for the first unique protocol, and the read-back parser 157 for the second unique protocol are generically called simply parsers). Not all of the status monitor PJL parser 151, the TCP/IP MIB parser/monitor 153, the read-back parser 155 for the first unique protocol, and the read-back parser 157 for the second unique protocol are activated on every occasion. One or a plurality of parsers corresponding to a printer which produces a print output are activated.

The status monitor PJL parser 151 analyzes the syntax of status information output in a format complying with a printer job language (PJL; Printer Job Language), and converts the status information into a universal data format (universal data) to which the status monitor UI 141 can make reference. In the embodiment, the printer 20 and the multifunction machine 30 have specifications complying with the PJL. The PJL is a known command language which enables control of various functions of a printer and has been developed by Hewlett-Packard company and later adopted by other companies.

The TCP/IP MIB parser/monitor 153 analyzes the syntax of status information acquired by a simple network management protocol (SNMP: Simple Network Management Protocol). The status information is converted into a universal data format to which the status monitor UI 141 can make reference. In the embodiment, the printer 40 has specifications complying with the SNMP protocol.

The read-back parser 155 for the first unique protocol analyzes the syntax of status information output in the format complying with the first unique protocol, and converts the status information into a universal data format to which the status monitor UI 141 can make reference. In the embodiment, the printers 50 and 60 have specifications complying with the first unique protocol.

The read-back parser 157 for second unique protocol analyzes the syntax of status information output in the format complying with the second unique protocol, and converts the status information into a universal data format to which the status monitor UI 141 can make reference. In the embodiment, the printer 70 has specifications complying with the second unique protocol.

Of the components belonging to these syntax analysis layers, the status monitor PJL parser 151, the TCP/IP MIB parser/monitor 153, the read-back parser 155 for the first unique protocol, and the read-back parser 157 for the second unique protocol establish a dynamic link to any one of an USB/LPT local arbitrator 161, an IEEE 1394 port arbitrator 163, and an IrDA port arbitrator 165 (hereinafter the USB/LPT local arbitrator 161, the IEEE 1394 port arbitrator 163, and the IrDA port arbitrator 165 are generically called simply arbitrators).

The USB/LPT local arbitrator 161, the IEEE 1394 port arbitrator 163, and the IrDA port arbitrator 165 are components having the function of performing arbitration operation such that data to be transferred to a certain process are not transferred to another process, by means of conducting arbitration with another process which utilizes the same port. Each of the USB/LPT local arbitrator 161, the IEEE 1394 port arbitrator 163, and the IrDA port arbitrator 165 has a structure compatible with an interface used when each of the parsers utilizes any of the arbitrators. Even when a dynamic link is established with any of the arbitrators, the arbitrator can be utilized by a parser by means of completely identical processing procedures. Specifications of class drivers (an LPT driver 171, an USB printer class driver 173, an IEEE 1394 printer class driver 175, and an IrDA printer class driver 177) offered by the OS differ according to drivers. There is also a case where the specifications differ according to versions of the OS. However, the parser can utilize each of the class drivers by way of the arbitrator compatible with the interface, and hence the parser can transmit data from the class driver to the parser without ascertaining the class drivers that differ according to the specifications of the port.

The configuration of the port arbitrator changes according to the type of a port provided in the computer and the type of an OS. For example, when the OS is Windows 98 (registered trademark) and the port is a USB port, access is made to the printer class driver for the USB. When the OS is Windows 2000 (registered trademark) and the port is a parallel port, access is made to a parallel class driver. Moreover, when the OS is Windows 2000 (registered trademark) and the port is a USB port, the name of the port is converted into the name of a symbolic link to the USB class driver. Access is made to the class driver through use of the symbolic link name.

As mentioned above, the port arbitrator corresponds to processing which depends on the OS or specifications of a port. However, the method for making access to the lower layer is a standard method offered by the OS or the class driver used. Hence, further detailed descriptions of the method are omitted.

The port arbitrator also performs inter-process port-exclusive processing. The inter-process port-exclusive processing uses a common exclusive processing function of the OS, and hence details of the processing are also omitted.

Incidentally, the data format is also changed. For example, in the case of a parallel port, the status information includes character string information returned as data from a printer, and port status information defined by a High/Low state of a signal line of each port. Some ports do not process the port status information. In the case, the port status information (READY or the like) is internally generated in a pseudo manner unless a problem arises in operation. Accordingly, when the hierarchical structure is viewed from a higher level, a status can be acquired by means of the same connection interface even in the case of an arbitrator of any port.

The LPT driver 171, the USB printer class driver 173, the IEEE 1394 printer class driver 175, and the IrDA printer class driver 177 are components offered by the OS. These components are activated when the PC 10 starts up or when a device corresponding to each class driver is activated. An LPT physical layer 181, a USB physical layer 183, an IEEE physical layer 185, and an IrDA physical layer 187 are hardware constituting respective printer ports.

Of the above-described configurations, the USB/LPT local arbitrator 161, the IEEE 1394 port arbitrator 163, and the IrDA port arbitrator 165 correspond to the primary processing unit. The status monitor PJL parser 151, TCP/IP MIB parser/monitor 153, the read-back parser 155 for the first unique protocol, and the read-back parser 157 for the second unique protocol correspond to the secondary processing unit. Moreover, the status monitor UI 141 corresponds to output control unit.

As mentioned above, an interface by way of which the employed parser utilizes the arbitrator is compatible with all of the USB/LPT local arbitrator 161, the IEEE 1394 port arbitrator 163, and the IrDA port arbitrator 165. Processing procedures used for utilizing these arbitrators are unified by the status monitor PJL parser 151, the TCP/IP MIB parser/monitor 153, the read-back parser 155 for the first unique protocol, and the read-back parser 157 for the second unique protocol. The employed parser and arbitrator can perform desired processing regardless of the combination of parser and arbitrator.

FIG. 3 is a list illustrating some of status information output from a PJL-compatible printer (the printer 20 or the multifunction machine 30 in the embodiment), status information output from a printer compatible with the first unique protocol (the printer 50 or the printer 60 of the embodiment), status information output from a printer compatible with the second unique protocol (the printer 70 in the embodiment), and status information output from a parser (the status monitor PJL parser 151, the read-back parser 155 for the first unique protocol, or the read-back parser 157 for the second unique protocol).

As shown in FIG. 3, the PJL, the first unique protocol, and the second unique protocol differ from each other in the format of status information. When the status information is converted by the parser (the status monitor PJL parser 151, the read-back parser 155 for the first unique protocol, or the read-back parser 157 for the second unique protocol), the status information is converted into binary data of a maximum of 72 bytes, as indicated by a "parser output" shown in FIG. 3.

Consequently, the status monitor UI 141 performs control operation for outputting and displaying status information on the display section 111 on the basis of the status information of unified format output by the parser (the status monitor PJL parser 151, the read-back parser 155 for the first unique protocol, or the read-back parser 157 for the second unique protocol).

Processing to be performed by respective units constituting the status information processor will be described more specifically by reference to the flowchart.

First, installation of the printer driver performed prior to processing for displaying status information will be described on the basis of the flowchart shown in FIG. 4. Installation of the printer driver is performed when a new printer (image forming apparatus) is made usable by way of the PC 10.

When printer driver installation processing is initiated, the PC 10 performs ordinary printer driver installation processing (S1010). Through processing pertaining to S1010, a series of processing operations which are commonly performed when a printer is connected to a PC; for example, there is executed processing for registering in a storage area which manages the OS a name of a file into which a program of a printer driver is stored.

The printer name and the parser name are registered in the status monitor setting file (S1020), and processing is completed. The status monitor setting file corresponds to correlation storage unit, and is a file stored in the HDD 107 of the PC 10. Various types of information items, which are required when the PC 10 acts as a status information processor, are recorded in the status monitor setting file. Through processing pertaining to S1020, the name of a printer corresponding to the printer driver that is being installed and the name of a parser corresponding to the printer (i.e., the name of a file where the parser program is stored) are recorded in pairs. The record is referred to when a parser to be activated is specified on the basis of the printer name during the course of processing to be described later.

Figure 5:
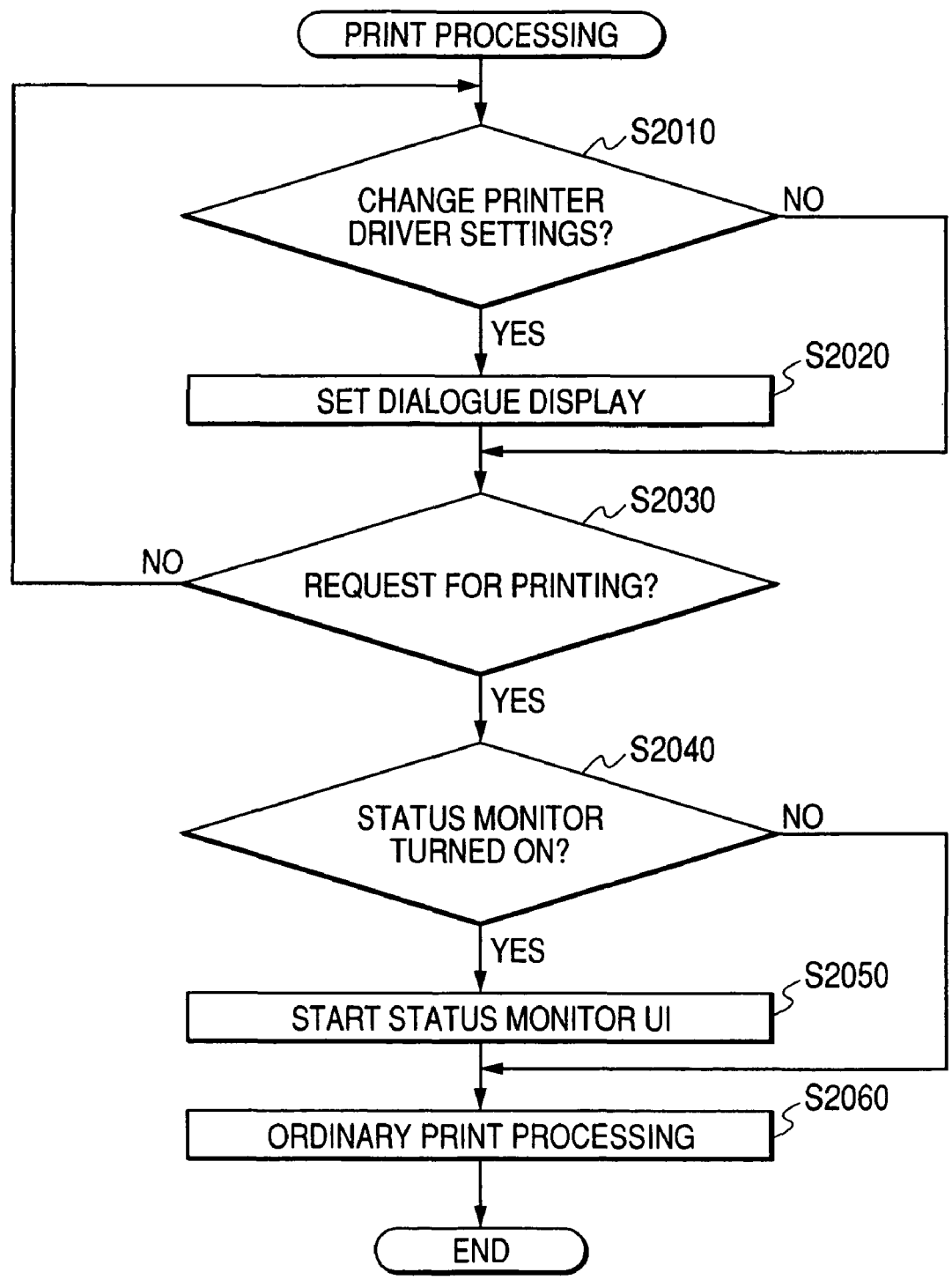
FIG. 5 is a flowchart of print processing performed by a printer driver.

Print processing to be performed by the printer driver 131 is now described on the basis of the flowchart shown in FIG. 5. Print processing is performed when the printer driver 131 is activated during the course of the PC 10 performing various types of processing in accordance with the application program having the print function.

When the processing is initiated, the printer driver 131 first determines whether or not setting of the printer driver 131 is effected (S2010). When the user is performing operation for effecting settings (YES in S2010), the user's operation is accepted by displaying a dialogue for setting purpose, and set specifics are stored in a predetermined storage area (S2020).

When the user is not performing operation for effecting settings (NO in S2010) or when processing pertaining to S2020 is completed, a determination is then made as to whether or not print processing is being performed (S2030). Here, when print processing is not yet being performed (NO in S2030), processing returns to processing pertaining to S2010. As a result, processing pertaining to S2010 to S2030 is repeated, whereupon processing for effecting settings of the printer is continually performed.

When processing pertaining to S2030 shows that print processing is being performed (YES in S2030), a determination is then made as to whether or not the status monitor is set to ON (S2040). Setting of the status monitor to ON/OFF can be performed through processing pertaining to S2020. When the status monitor is set to ON (YES in S2040), the status monitor UI 141 is activated as another process (S2050).

When the status monitor has not been set to an ON position (NO in S2040) or when processing pertaining to S2050 is completed, ordinary print processing is subsequently performed (S2060), and the processing is terminated. Processing pertaining to S2060 is for transmitting, to a printer, print data sent from a spooler system in accordance with a FIFO protocol or processing for subjecting the print data to secondary processing. These processing is known processing, and hence its detailed explanation is omitted.

Figure 6:
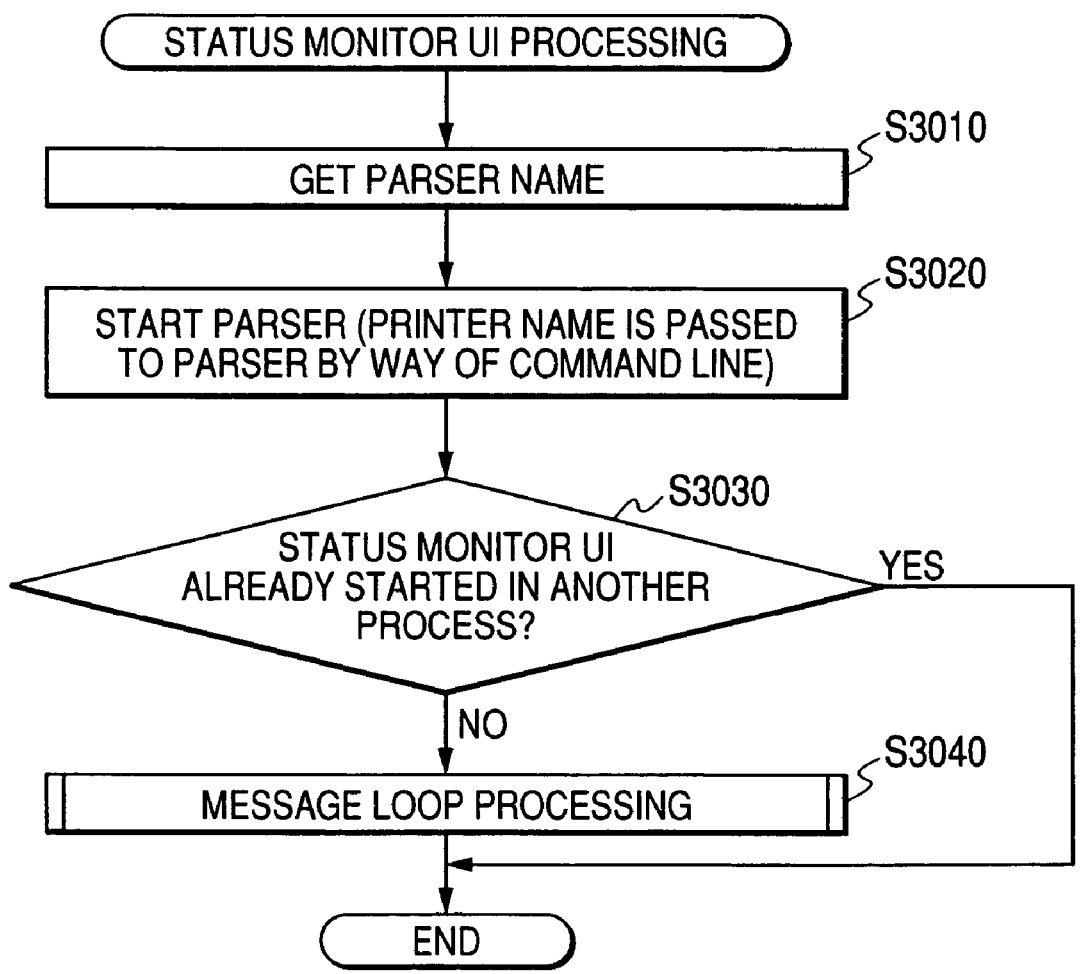
FIG. 6 is a flowchart of processing of a status monitor UI.

Processing of the status monitor UI 141 activated through processing pertaining to S2050 will now be described on the basis of the flowchart shown in FIG. 6.

After initiation of processing, the status monitor UI 141 reads the name of the parser (S3010). Through processing, reference is made to the information that has been registered in the status monitor setting file by means of processing pertaining to S1020 (i.e., the correlation between the printer name and the parser name), and the parser name corresponding to the printer that is a target of the status monitor UI 141 is read.

The parser is activated as another process through use of the parser name read, through processing pertaining to S3010 (S3020). At the time, a printer name is passed to the parser by way of a command line.

A determination is made as to whether or not the status monitor UI 141 has already been activated through another process (S3030). If the monitor has not yet been activated (NO in S3030), processing proceeds to message loop processing (S3040). In contrast, when the status monitor UI 141 has already been activated (YES in S3030) or when processing pertaining to S3040 has been completed, processing is terminated.

Figure 7:
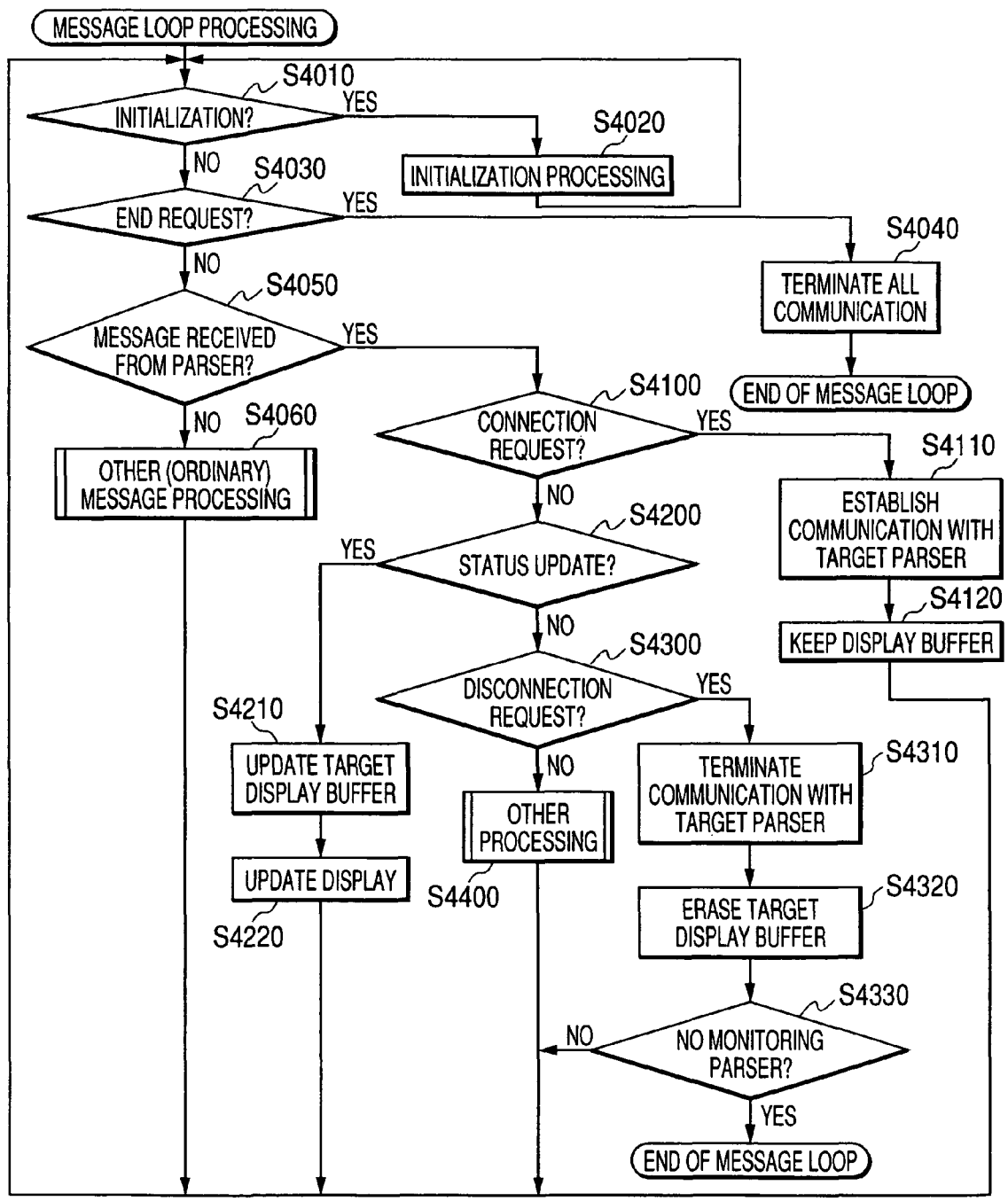
FIG. 7 is a flowchart of message loop processing performed by the status monitor UI.

Specifically, message loop processing pertaining to S3040 becomes processing such as that shown in a flowchart in FIG. 7. Through message loop processing, determination of specifics of the command that will arrive at a message and execution of processing corresponding to the command (message) are repeated.

Specifically, a determination is first made as to whether or not the command represented by the message is "initialization" (S4010). If the message is "initialization" (YES in S4010), initialization processing is executed, and processing returns to processing pertaining to S4010.

When the command represented by the message is not "initialization" (NO in S4010), a determination is made as to whether or not the command represented by the message is "end request" (S4030). If the command is "end request" (YES in S4030), all communication with other processes is terminated (S4040), and message loop processing is terminated.

When the command represented by the message is not "end request" (NO in S4030), a determination is made as to whether or not the command corresponds to a message from a parser (S4050). Here, the term "message from a parser" means a message which has originated from the process of the parser activated through processing pertaining to S3020. Specifics of processing performed by the parser will be described in detail later. Through message loop processing, various processing operations are performed while communication is established between a process and the parser.

When processing pertaining to S4050 shows that the message is not a message from the parser (NO in S4050), processing for another message is performed (S4060), and processing returns to S4010.

When processing pertaining to S4050 shows that the message is a message from the parser (YES in S4050), a determination is made as to whether or not the command represented by the message is "connection request" (S4100). If the command represents "connection request" (YES in S4100), communication is established with a parser which is a target of communication (S4110). No particular limitations are imposed on specific procedures or methods for establishing communication with a parser which is to be a target, so long as an arrangement which enables mutual communication between processes is provided. The embodiment employs a method for attaching the command to the shared memory ensured through parser processing to be described later and exchanging data between processes by way of the shared memory. A display buffer is kept (S4120), and processing returns to S4010. The display buffer is for displaying and outputting status information to the display section 111 provided on the PC 10.

When the command represented by the message is not "connection request" (NO in S4100), a determination is made as to whether or not the command represented by the message is "status update" (S4200). If the command is "status update" (YES in S4200), the status information is read from the attached shared memory. The status information is written into a target display buffer, thereby updating the status (S4210). The display buffer is memory ensured through processing pertaining to S4120. When a plurality of parsers are activated, processing pertaining to S4210 is-performed in a number of repetitions equal to the plurality of parsers. Since the plurality of display buffers are ensured, the parser from which the message has originated is specified on the basis of the message, through processing pertaining to S4210. A display buffer is updated while the display buffer corresponding to the thus-specified parser is taken as a target. After the display buffer has been updated, the thus-updated status information is actually displayed and output to the display section 111 of the PC 10. Accordingly, control for updating the display of the display section 111 is performed (S4220), and processing returns to S4010.

When the command represented by the message is not "status update" (NO in S4200), a determination is made as to whether or not the command represented by the message is "disconnection request" (S4300). If the command is "disconnection request" (YES in S4300), communication with the target parser is terminated (S4310). Specifically, in the embodiment, the shared memory attached through processing pertaining to S4110 is detached. However, when communication between processes is implemented in processing pertaining to S4110 by means other than the shared memory, processing for releasing a resource ensured for communication between processes, or like processing, is performed. Subsequently, the target display buffer ensured through processing pertaining to S4120 is erased (S4320). Even in processing pertaining to S4310 and S4320, the parser from which the message has originated is specified, and communication with the thus-specified parser is terminated. A display buffer is erased while a display buffer corresponding to the thus-specified parser is taken as a target. A determination is made as to whether or not processes for the parser, which is a target of monitoring, have become extinct (S4330). If processes for the parser which is to be a target of monitoring still remain (NO in S4430), processing returns to S4010. In contrast, when there is no process for the parser which is to be a target of monitoring (YES in S4430), message loop processing is completed.

Figure 8:
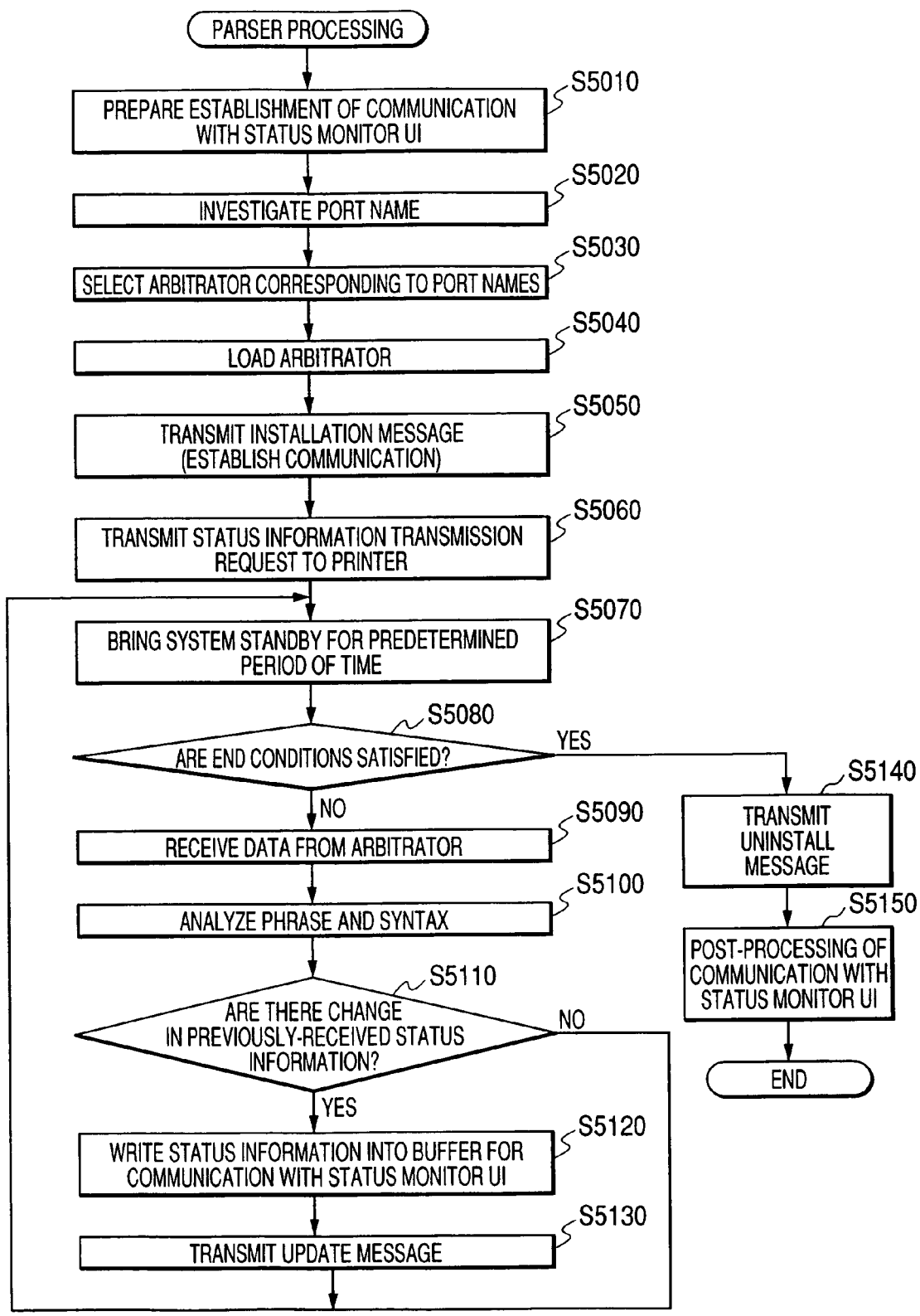
FIG. 8 is a flowchart of parser processing.

In parallel with the status monitor UI 141 performing the above-described message loop processing, the parser activated through processing pertaining to S3020 (the status monitor PJL parser 151, the read-back parser 155 for the first unique protocol, or the-read back parser 157 for the second unique protocol) performs parser processing such as that indicated by the flowchart shown in FIG. 8.

Through parser processing, preparation is made for establishing communication with the status monitor UI (S5010). Specifically, processing for ensuring a memory area which is to be shared memory is performed. On the basis of a printer name provided as an argument passed at startup of the parser, the port name used by the printer is searched (S5020). On the basis of the port name, an arbitrator to be utilized is selected (S5030).

In the embodiment, the arbitrator which is a target of selection is any one of the USB/LPT local arbitrator 161, the IEEE 1394 port arbitrator 163, and the IrDA port arbitrator 165, all of which have been described previously. A program for implementing the function of the arbitrator is provided as a dynamic link library (hereinafter also called DLL). By means of a process for performing parser processing, the arbitrator selected through processing pertaining to S5030 is loaded into memory (S5040). Thereby, the parser becomes able to acquire status information by utilization of an arbitrator corresponding to a port utilized by the printer that is a target of processing.

The interface by way of which the parser utilizes the arbitrator is in a call format compatible with all of the USB/LPT local port arbitrator 161, the IEEE 1394 port arbitrator 163, and the IrDA port arbitrator 165. Even when any of the USB/LPT local port arbitrator 161, the IEEE 1394 port arbitrator 163, and the IrDA port arbitrator 165 is linked to the parser, the parser can utilize the arbitrator with the same processing procedures without becoming aware of which one of the arbitrators is linked thereto.

After processing mentioned above has been completed, the parser transmits an attach request message (connection message) in response to the process of the status monitor UI 141 (S5050) The attach request message becomes an opportunity for performing processing pertaining to S4100 to S4120. At a point in time when processing of the status monitor UI 141 has been completed, communication is established between the status monitor UI 141 and the parser.

Subsequently, the parser transmits a status information transmission request to the printer (S5060). In consideration of specifications of a printer which is to become a target of transmission and specifications of a printer port used by the printer, the specific transmission method is arbitrary, so long as the method enables issuance of a status information transmission request to the printer without involvement of a problem. In the embodiment, the status information transmission request is sent to the printer by processing the status information transmission request as one print job by utilization of a spooler system provided in the PC 10. The spooler system is configured such that the print job is processed by the FIFO. The status information transmission request is transmitted to the printer by way of the spooler system. The ordinary print job and the status information transmission request can be prevented from being simultaneously transmitted to the printer in a mixed manner.

Subsequently, the parser waits for a predetermined period of time (S5070), and determines whether or not end conditions are satisfied (S5080). Processing pertaining to S5070 is for preventing repetition of processing pertaining to S5080 to S5130, which will be described later, with excessive frequency. In the embodiment, the parser is held in a standby condition for one second. The end conditions are usually determined to be satisfied through processing pertaining to S5080 when operation for completing processing has been performed. There may be a case where the end conditions are satisfied for another reasons, such as an error.

The end conditions are usually not satisfied during print output operation (NO in S5080), and hence data (status information) from the arbitrator are received (S5090). In the embodiment, in relation to the data received through processing pertaining to S5090, the parser ensures memory which is to become a receiving buffer, and passes the address of the receiving buffer to the arbitrator as an argument. The arbitrator stores data in the specified address, whereby the parser receives the data.

In the case where the arbitrator is an USB/LPT local port arbitrator 161, the status information output from the printer 20 connected by way of the USB, the multifunction machine 30, or the printer 60 is input in accordance with a scheme complying with the specifications of the LPT class driver 171 or those of the USB printer class driver 173, and the thus-input status information is stored in the receiving buffer. If the arbitrator is the IEEE 1394 port arbitrator 163, the status information output from the printer 50 is input in accordance with the scheme complying with specifications of the IEEE 1394 printer class driver 175, and the thus-input status information is stored in the receiving buffer. If the arbitrator is the IrDA port arbitrator 165, the status information output from the printer 70 is input in accordance with the scheme complying with specifications of the IrDA printer class driver 177, and the thus-input information is stored in the receiving buffer. As mentioned above, each of the arbitrators inputs status information in accordance with the scheme complying with specifications of each class driver. The thus-input status information is stored in the receiving buffer in a format which does not depend on the specifications of each class driver. Hence, the parser can make reference to the status information stored in the receiving buffer without becoming fully aware of specifications of the printer port. As provided in the respective fields "PJL," "First unique protocol," and "Second unique protocol" shown in FIG. 3, the status information stored in the receiving buffer is in an intermediate data format (intermediate data) depending on the specifications of the printer.

Therefore, the parser analyzes phrases and a syntax of the status information stored in the receiving buffer (S5100). When comparison with the previously-received status information reveals that no changes have arisen (NO in S5110), processing returns to S5070, whereby processing pertaining to S5070 to S5130 is repeated.

When changes have arisen in the previously-received status information (YES in S5110), the status information is written into the receiving buffer of the status monitor UI (S5120). The communication buffer into which the status information is written through processing pertaining to S5120 is shared memory ensured through processing pertaining to S5010. Status information is written into the shared memory, so that the status monitor UI 141 can refer to the up-to-date status information. The status information written into the shared memory through processing pertaining to S5120 is subjected to custom-designed phrase analysis/syntax analysis in terms of "PJL," "First unique protocol," and "Second unique protocol". As a result, the status monitor UI 141 can refer to the status information stored in the shared memory without becoming fully aware of the specifications of the printer, such as "PJL," "First unique protocol," and "Second unique protocol".

After having written the status information unified to "Parser Output" specifications into the shared memory by means of processing pertaining to S5120, the parser transmits a status update message to the process of the status monitor UI 141 (S5130) This message is to be an opportunity for performing processing pertaining to S4200 to S4220 through the previously-described message loop processing pertaining to the status monitor UI 141. After completion of processing pertaining to S5130, processing returns to S5070, whereby processing pertaining to S5070 to S5130 is repeated.

When the end conditions of processing pertaining to S5080 are satisfied by means of the operator's operation through repetitive processing (YES in S5080), a detach request message (disconnection message) is transmitted (S5140). The detach request message is to be an opportunity for performing processing pertaining to S4300 to S4330 through previously-described message loop processing pertaining to the status monitor UI 141. Post-processing pertaining to communication with the status monitor UI is performed (S5150), and processing is terminated. During processing pertaining to S5150, there is performed processing for releasing the shared memory prepared through processing pertaining to S5010.

Of the previously-described processing operations, the print processing operation (see FIG. 5) performed by the printer driver 131 is performed every time there is produced a print output to any of the printer 20, the multifunction machine 30, the printer 50, the printer 60, and the printer 70. Accordingly, there may be a case where these processing operations are performed in parallel with each other. Processing pertaining to S2050 is performed during the course of the respective processing operations. Therefore, there may be a case where the plurality of status monitors UI 141 are started-up; and where a plurality of status monitor UI processing operations (see FIGS. 6 and 7) are performed in parallel with each other. Processing pertaining to S3020 is performed during the respective status monitor UI processing operations. Therefore, the plurality of parsers (the status monitor PJL parser 151, the read-back parser 155 for first unique protocol, and the read-back parser 157 for second unique protocol) are started-up, and a plurality of parser processing operations (see FIG. 8) are performed in parallel with each other.

Even when a plurality of parsers have been started-up, processing pertaining to S3030 is performed after start-up of the parser through processing pertaining to S3020, whereby only the first-started status monitor UI 141 performs processing pertaining to S3040. The second or subsequently-started status monitor UI 141 finishes processing without performing message loop processing, and the process is completed. The plurality of parsers started by the plurality of status monitors UI 141 establish inter-process communication with the first-started status monitor UI 141. Status information output from the respective parsers is received by the single status monitor UI.

In a state where the arbitrator (primary processing unit), the parser (secondary processing unit), and the status monitor UI 141 (output control unit), all of which correspond to the first printer (the image forming apparatus), are operating in the sequence in which print processing has been started, an arbitrator, a parser, and a status monitor UI 141, all of which correspond to the second or subsequent printer, are operated. In the case, the arbitrator and the parser, both of which correspond to the second or subsequent printer, operate separately from the arbitrator and the parser, both of which correspond to the first printer. The status monitor UI 141 corresponding to the first printer also functions as a status monitor UI 141 corresponding to the second or subsequent printer.

The above configuration allows the single status monitor UI 141 to perform processing corresponding to a plurality of sets, each set consisting of the arbitrator and the parser. Accordingly, the configuration of the status information processor can be made simple so as to reduce consumption of resources as compared with a case where the plurality of status monitors UI 141 are present. The single status monitor UI 141 controls output information in a centralized manner. As compared with a case where a plurality of status monitors UI 141 randomly produce information outputs, the status information can be offered to the user in a more easily-readable manner. Thus, superior provision of information becomes feasible.

As has been described above, according to the status information processor configured by the PC 10, the arbitrator (primary processing unit) corresponds to units that are selected from a plurality of arbitrators changing according to an OS or specifications of a printer port (input-output port) and provided in the PC 10. The parser (secondary processing unit) corresponds to units that are selected from a plurality of parsers changing according to specifications of the printer (the image forming apparatus) and is provided in the PC 10. Moreover, interfaces (specifications, or the like, used for storing status information into a receiving buffer specified by the parser) to parsers utilized by the plurality of arbitrators are compatible. In addition, interfaces (specifications, or the like, for transmitting the address of the receiving buffer to the arbitrator) to arbitrators utilized by a plurality of parsers are compatible. The arbitrator and the parser can operate in conjunction with each other even when provided in the computer in any combination.

Accordingly, in the case of the above-described embodiment, three types of arbitrators, which differ from each other in terms of an OS or specifications of a printer port, are prepared. Although three types of parsers are prepared for reasons of changes in specifications of the printer, 3-times-3 types (nine types) of combinations can be addressed by mere combination of these six types of means. When compared with a case where nine types of means are prepared as in the case of a related-art status information processor, cost and time, which are consumed by development and manufacture, can be reduced.

Although the TCP/IP MIB parser/monitor 153 is configured to acquire status information by way of the TCP/IP 191, a portion of the parser/monitor corresponding to the primary processing unit and a portion of the same corresponding to the secondary processing unit are not clearly distinguished from each other. Therefore, the TCP/IP MIB parser/monitor 153 does not correspond to the component that can constitute the status information processor. All of the status monitor PJL parser 151, the read-back parser 155 for the first unique protocol, and the read-back parser 157 for the second unique protocol are compatible with the interface to the status monitor UI 141. Specifically, the status monitor UI 141 corresponding to the output control unit can also operate in conjunction with the TCP/IP MIB parser/monitor 153 that does not correspond to the primary processing unit or secondary processing unit. Not all of the modules operating in conjunction with the status monitor UI 141 need to form the configuration. According to such a module configuration, when an existing module, in which no clear distinction exists between a portion corresponding to the primary processing unit and another portion corresponding to the secondary processing unit, is adopted as a related-art module, the status information processor can coexist with such a related-art product. Therefore, a shift from a related-art type of module is also easy.

Although the method for selecting an arbitrator corresponding to a port name on the basis of the port name to be utilized has been described in the embodiment as a method for selecting a port arbitrator in the parser, the parser may store, as internal data, information indicating a correlation between a port name and a corresponding arbitrator. Alternatively, a setting file other than the parser has been prepared in advance, and a correlation between a port name and an arbitrator may be acquired by means of the parse referring to the setting file.

More specifically, For example, a rewritable setting file which describes a correlation between a port name and a corresponding arbitrator is prepared in the format of port name=a corresponding arbitrator, as provided below.

LPT1:=portArbitrator1.exe
LPT2:=portArbitrator1.exe
LPT3:=portArbitrator1.exe
USB0001=portArbitrator2.exe
USB0002=portArbitrator2.exe
IRDA1=portArbitrator3.exe The parser reads a corresponding arbitrator by reference to the setting file, and uses the thus-read arbitrator.

When a new port is employed, an arbitrator compatible with the new port is prepared, and the setting file is changed. As a result, the new port can be addressed without rewriting the parser itself.

There is no necessity for preparing an arbitrator for each single OS or port. For example, even in the case of another port, if internal processing of the port is close to that of an existing port, the port can be addressed by a single port arbitrator. A port which can perform processing even when an OS has changed may be used commonly for a plurality of operating systems.

Although the above-described embodiment has illustrated a case where the status monitor UI 141 provides a display of status information on the display section 111 of the PC 10, a specific destination of an output is arbitrary. For example, status information may be output on a file in the form of a log. Alternatively, a printer specifically designed for outputting a log is prepared, and a print output may be produced through use of the printer. Even when a display output is produced, data are temporarily output to the file. The file may be displayed by utilization of a general-purpose display program.

Although the above-described embodiment has illustrated specifications of a specific printer port or those of the specific printer, no limitations are imposed on the specifications of the printer port and those of the printer.

Although the above-described embodiment has illustrated specific examples, such as a message or shared memory, as means for establishing inter-process communication between the status monitor UI 141 and the parser, means for establishing inter-process communication is arbitrary. For example, any communication methods; e.g., mutex or semaphore, may be utilized.

In the embodiment, in order to link the parser to the arbitrator, the arbitrator is prepared as a dynamic link library. The arbitrator requiring a parser is dynamically linked. However, the arbitrator that requires the parser may be configured to start up as another process. In the case, as in the case of the method for operating the status monitor UI 141 and the parser in conjunction with each other, the parser and the arbitrator perform inter-process communication, thereby transmitting mutually-required information.

In the embodiment, the printer driver 131 is configured to start the status monitor UI 141. However, the status monitor UI 141 may be started by another method. For example, the port monitor may start the status monitor UI 141. Alternatively, the status monitor UI 141 maybe configured so that the user can start the status monitor UI 141 by means of manual operation.

As described above with reference to the embodiment, there is provided a status information processor that operates on a computer that is provided with an operating system. The status information processor includes: at least one of primary processing units that is provided selectively from among the primary processing units that each receives status information representing status of an image forming apparatus from the image forming apparatus through an input-output port provided in the computer in a format depending on the operating system and on specifications of the input-output port, and converts the status information into intermediate data that is independent from the operating system and the input-output port; at least one of secondary processing units that is provided selectively from among the secondary processing units that each converts the intermediate data into a universal data that is independent from specifications of the image forming apparatus; and an output control unit that outputs the universal data to an output device. Each of the primary processing units has an interface compatible with any one of the secondary processing units. Each of the secondary processing units has an interface compatible with any one of the primary processing units. The primary processing units and the secondary processing units operate in conjunction with each other when provided in any combination.

In the status information processor thus configured, the status information transmitted from the image forming apparatus is processed by primary processing unit. Access procedures of a port vary according to the nature of the port or an OS. Access methods are provided below. (1) Access is made to a bus driver of a port. (2) Access is made to a class driver provided for each function of the port. (3) Access is made through use of a standard function of the OS. (4) Access is made to a virtual device of the port.

Even in the case of the method (2) for making access to a class driver, there may be a case where a method for specifying the class driver becomes different according to variations in the OS.

As mentioned above, a port of the status information, whose processing varies according to the OS or port, is processed by the primary processing unit. Put another way, all of the constituent elements, except the primary processing unit, are not dependent on the OS or port. As a result of being transferred by way of the primary processing unit, the status information is converted into data which are not dependent on the OS and the input-output port.

In addition to the status information, which is in the form of data such as ordinary text data, status information indicating a High/Low voltage of a plurality of signal lines of the port is also available in the LPT port. However, there is another conceivable case where another port does not have such status information or where alignment of bits is different. In such a case, harmless dummy data are added for primary processing that is used for processing a port having no status information. In a case where alignment of bits is different, the alignment of bits is changed in primary processing unit such that the same bit represents the same status.

The status information that has been converted into data independent of the OS and the specifications of the input-output port is subsequently converted by secondary processing unit, from data which differ from each other according to specifications of the image forming apparatus into data which do not differ from each other according to the specifications of the image forming apparatus.

The data that do not vary according to specifications of the image forming apparatus signify data that are free from changes in data structure or contents of data, which would be attributable to specifications of the image forming apparatus. By way of a specific example, status information is transmitted in the form of text data from a certain image forming apparatus, and status information is transmitted in the form of binary data from another certain image forming apparatus. These sets of data correspond to data which vary according to specifications of an image forming apparatus. The secondary processing unit converts the data which vary according to specifications of the image forming apparatus into data which do not vary according to specifications of the image forming apparatus.

A specific method for converting status information into data which do not vary according to specifications of an image forming apparatus is arbitrary. For example, status information is transmitted in the form of-text data from a certain image forming apparatus, and status information is transmitted in the form of binary data from another image forming apparatus. In the case, the text data may be binarized so as to assume the same data structure as that of the binary data. Alternatively, the binary data may be converted into text data so as to assume the same data structure as that of the text data. Alternatively, the text data and the binary data may be converted into a third data structure which differs from the text data and the binary data.

The status information converted into data which do not vary according to specifications of the image forming apparatus is output to a device which is a destination of output, by the output control unit. A typical device which is to become a destination of output includes a display device for outputting a display and a storage device for outputting data to a file. However, a device other than these devices may also be acceptable. Moreover, the device which is to become a destination of output is not necessarily fixed to a specific physical device. For example, if a standard output specified by the OS is taken as a destination of output, a physical device allocated to a standard output by operation of the OS can be changed arbitrarily, and an arbitrary physical device (e.g., a display, a printer, a storage device, or the like) can be taken as a destination of output.

The status information processor is configured by providing the above-described respective units to a computer. Particularly, the primary processing unit is such that at least one is selected from the plurality of primary processing unit which vary according to the OS or specifications of an input-output port, and that the thus-selected primary processing unit is provided for the computer. The secondary processing unit is a unit such that at least one is selected from the plurality of secondary processing unit which vary according to specifications of the image forming apparatus, and that the thus-selected secondary processing unit is provided for the computer. An interface to the secondary processing unit that is utilized by the plurality of primary processing unit is compatible with the secondary processing unit, and an interface to the primary processing unit that is utilized by the plurality of secondary processing unit is compatible with the primary processing unit. The primary processing unit and the secondary processing unit can operate in conjunction with each other even when provided in any combination in the computer.

For example, "mm" types of differences exist in an OS or specifications of an input-output port. "n" types of differences exist in the status information according to specifications of the image forming apparatus. In such a case, an arbitrary status information processor can be configured by combination of "m" types of primary processing unit with "n" types of secondary processing unit without separately forming "m×n" types of status information processors. For example, when specifications of an image forming apparatus differing from those of existing "n" types are newly added, an arbitrary status information processor can be configured by mere addition of corresponding secondary processing unit while using existing primary processing unit in its present form.

Therefore, when compared with the status monitor in the related art, the status information processor can curtail cost and time required for development and manufacture.

In the status information processor, it is preferable to be configured as follows. That is, additional one of the primary processing units is allowed to be additionally provided while at least one of the primary processing units is provided, and additional one of the secondary processing units is allowed to be additionally provided while at least one of the secondary processing units is provided. The primary processing units including the additional one of the primary processing units and the secondary processing units including the additional one of the secondary processing units operate in conjunction with each other when provided in any combination.

According to the status information processor thus configured, a status information processor can be configured by addition of another primary or secondary processing unit to the computer that is already provided with at least one primary or secondary processing unit.

In the status information processor, it is preferable to be configured as follows. That is, each of the secondary processing units has an interface compatible with the output control unit, and wherein the secondary processing units and the output control unit operate in conjunction with each other when any of the secondary processing units is provided in any combination.

According to the status information processor thus configured, even when a computer is provided with any of a plurality of secondary processing unit, an arbitrary status information processor can be configured by utilization of the same output control unit. Therefore, when compared with a case where output control unit corresponding to the respective secondary processing unit are provided separately, cost and time, which are incurred by development and manufacture of the output control unit, can be reduced.

In the status information processor, it is preferable to be configured as follows. That is, when providing additional one of the primary processing units and additional one of the secondary processing units for a second or subsequent image forming apparatus while the primary processing unit, the secondary processing unit, and the output control unit for a first image forming apparatus are provided, the additional one of the primary processing units and the additional one of the secondary processing units for the second or subsequent image forming apparatus is provided separately from the primary processing unit and the secondary processing unit for the first image forming apparatus, and the output control unit for the first image forming apparatus serves to output the universal data converted by the additional one of the secondary processing units.

According to the status information processor thus configured, processing corresponding to a plurality of sets, each of which consists of primary and secondary processing unit, can be performed by single output control unit. Hence, the configuration of the status information processor can be made simpler than that achieved when a plurality of output control unit are present. The single output control unit manages output information in a unified manner, thereby performing processing.

The status information processor may further include a correlation storage unit that stores, in connection with the image forming apparatus in which the status information is to be output, information indicating a correlation between a name for identifying the image forming apparatus and the secondary processing unit for the image forming apparatus, wherein the correlation storage unit stores the information indicating the correlation between the name and the secondary processing unit for the image forming apparatus that is to become a target of control by the computer, when an image forming apparatus control program corresponding to the image forming apparatus is installed in the computer in order to add the image forming apparatus as one of targets of control by the computer, and wherein the secondary processing unit is provided by reference to the information stored in the correlation storage unit to specify the secondary processing unit that is correlated with the name of the image forming apparatus that is to become a target of output of the status information.

In the status information processor thus configured, in order to add an image forming apparatus which is a target of control of the computer, when an image forming apparatus control program corresponding to the image forming apparatus which is to become the target of control is installed in the computer, a correlation between a name used for identifying the image forming apparatus and secondary processing unit is registered in the correlation storage unit in connection with the image forming apparatus that is to become a target of control. Consequently, when secondary processing unit is operated after the image forming apparatus has become available in association with installation of the image forming apparatus control program, reference is made to correlation storage unit, to thus enable specification of secondary processing unit corresponding to the designation of the image forming apparatus that has become a target of output of the status information, as well as activation of the specified secondary processing unit.

In the status information processor, it is preferable to be configured as follows. That is, when the image forming apparatus to become the target of output of the status information is specified, the output control unit performs a processing to refer the information stored in the correlation storage unit to specify the secondary processing unit and performs to provide and activate the secondary processing unit specified by the reference, wherein the secondary processing unit activated by the output control unit performs a processing to specify the input-output port used by the image forming apparatus, and performs to provide and activate the primary processing unit corresponding to the specified input-output port.

According to the status information processor thus configured, the output control unit, the secondary processing unit, and the primary processing unit start operation in the sequence. When the primary processing unit starts operation, the output control unit and the secondary processing unit have already been operated.

As described above with reference to the embodiment, there is provided a computer-readable program product for causing a computer that is provided with an operating system to perform procedures of a secondary processing unit provided in a status information processor. The program product causes the computer to perform procedures including: selecting at least one of primary processing units from among the primary processing units that each receives status information representing status of an image forming apparatus from the image forming apparatus through an input-output port provided in the computer in a format depending on the operating system and on specifications of the input-output port, and converts the status information into intermediate data that is independent from the operating system and the input-output port; and converting the intermediate data into a universal data that is independent from specifications of the image forming apparatus.

The foregoing description of the embodiment has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application program to enable one skilled in the art to utilize the invention in various embodiments and with various modifications as are suited to the particular use contemplated. It is intended that the scope of the invention be defined by the claims appended hereto, and their equivalents.

What is claimed is:

1. One or more non-transitory computer readable storage media having components executable by a computer stored thereon, the components comprising:

two or more class drivers, each class driver being provided for a corresponding input-output port in the computer and outputting status information representing status of an image forming apparatus from the image forming apparatus in a format depending on specifications of the each class driver and depending on specifications of the image forming apparatus;

two or more arbitrators that are provided selectively from among the arbitrators that each is a program module and receives the status information from a class driver of the two or more class drivers in the format depending on specifications of the class driver and depending on specifications of the image forming apparatus, and converts the status information into intermediate data that is independent from the specifications of the class driver and dependent on specifications of the image forming apparatus;

two or more parsers that are provided selectively from among the parsers that each is a program module and converts the intermediate data into universal data that is independent from the specifications of the class driver and independent from the specifications of the image forming apparatus;

a status monitor that acquires the universal data and outputs the universal data to an output device; and a correlation storage component that causes correlation information to be stored indicating a correlation between a name for identifying each image forming apparatus and a parser for the image forming apparatus, wherein each of the arbitrators has an interface compatible with each one of the parsers, wherein each of the parsers has an interface compatible with each one of the arbitrators, wherein the format of the intermediate data converted by each of the arbitrators is configured to be received by each of the parsers, wherein each of the parsers is configured to convert the format of the intermediate data converted by each of the arbitrators into the universal data, wherein when an image forming apparatus is specified as a target apparatus of output of the status information, the status monitor selects one of the parsers based on the specified target apparatus and the correlation information, and activates the selected one of the parsers, wherein the activated parser selects one of the arbitrators based on an input-output port corresponding to the specified target apparatus, and activates the selected one of the arbitrators, and wherein the status information from the target apparatus is converted into the intermediate information by the activated arbitrator and is further converted into the universal data by the activated parser, and then output by the status monitor.

2. The one or more non-transitory computer readable storage media according to claim 1, wherein the computer is provided with an operating system, and wherein each of the arbitrators receives the status information in a format depending on the specifications of the class driver and on the operating system, and converts the status information into the intermediate data that is independent from the specifications of the class driver and the operating system.

3. The one or more non-transitory computer readable storage media according to claim 1, wherein the arbitrators and the parsers operate in conjunction with each other when provided in any combination.

4. The one or more non-transitory computer readable storage media according to claim 1, wherein an additional one of the arbitrators is allowed to be additionally provided while the two or more of the arbitrators are provided, and wherein an additional one of the parsers is allowed to be additionally provided while the two or more of the parsers are provided.

5. The one or more non-transitory computer readable storage media according to claim 4, wherein the arbitrators including the additional one of the arbitrators and the parsers including the additional one of the parsers operate in conjunction with each other when provided in any combination.

6. The one or more non-transitory computer readable storage media according to claim 4, wherein, when providing an additional one of the arbitrators and an additional one of the parsers for a second or subsequent image forming apparatus while the arbitrators, the parsers, and the status monitor for a first image forming apparatus are provided, the additional one of the arbitrators and the additional one of the parsers for the second or subsequent image forming apparatus is provided separately from the arbitrators and the parsers for the first image forming apparatus, and the status monitor for the first image forming apparatus serves to output the universal data converted by the additional one of the parsers.

7. The one or more non-transitory computer readable storage media according to claim 1, wherein each of the parsers has an interface compatible with the status monitor, and wherein the parsers and the status monitor operate in conjunction with each other when any of the parsers is provided in any combination.

8. The one or more non-transitory computer readable storage media according to claim 1, wherein the correlation information indicating the correlation between the name and the parsers for the image forming apparatus that is to become a target of control by the computer is stored, when an image forming apparatus control program corresponding to the image forming apparatus is installed in the computer in order to add the image forming apparatus as one of targets of control by the computer, and wherein the parser is provided by reference to the correlation information stored to specify the parser that is correlated with the name of the image forming apparatus that is to become a target of output of the status information.

9. The one or more non-transitory computer readable storage media according to claim 1, wherein each input-output port includes one of a serial interface and a parallel interface.

* * * * *

UNITED STATES PATENT AND TRADEMARK OFFICE
CERTIFICATE OF CORRECTION

PATENT NO. : 8,014,014 B2
APPLICATION NO. : 11/199302
DATED : September 6, 2011
INVENTOR(S) : Masatoshi Kadota It is certified that error appears in the above-identified patent and that said Letters Patent is hereby corrected as shown below:

Column 20, Claim 1, Line 14:
Please delete "the components comprising:" and insert -- the computer including an OS having two or more class drivers, each class driver being provided for a corresponding input-output port in the computer and outputting status information representing status of an image forming apparatus from the image forming apparatus in a format depending on specifications of the each class driver and depending on specifications of the image forming apparatus, the components comprising: --

Column 20, Claim 1, Lines 15-21:
Please delete in their entirety

Column 21, Claim 2, Lines 2-3:
Please delete "wherein the computer is provided with an operating system, and"

Signed and Sealed this
Twentieth Day of March, 2012

David J. Kappos
*Director of the United States Patent and Trademark Office*